United States Patent
Cuir et al.

[15] 3,695,132
[45] Oct. 3, 1972

[54] APPARATUS FOR CUTTING SHEET MATERIAL

[72] Inventors: Jean Pierre Cuir; Gerard Cuir, both of 4, rue du Chateau, 59 Lille, France

[22] Filed: Nov. 12, 1970

[21] Appl. No.: 88,572

[30] Foreign Application Priority Data

Nov. 13, 1969 France..................6939101

[52] U.S. Cl. .....................83/98, 83/152, 83/284, 83/402, 83/509
[51] Int. Cl. ...................B26d 1/56, B26d 7/18
[58] Field of Search.................83/284, 402, 98–100, 83/152, 509

[56] References Cited

UNITED STATES PATENTS

| 3,181,404 | 5/1965 | Walker | 83/98 |
| 2,523,153 | 9/1950 | Shapiro | 83/98 |
| 3,459,080 | 8/1969 | Goettsch | 83/98 |

*Primary Examiner*—Donald G. Kelly
*Attorney*—Robert E. Burns and Emmanuel J. Lobato

[57] ABSTRACT

An apparatus for cutting sheet material comprises a first member having a reaction surface and a second member carrying a cutting blade for cooperating with the reaction surface to cut sheet material into portions when passed between the first and second members. Elements are provided for maintaining one portion in the apparatus while other elements are provided for repelling another portion from the apparatus.

6 Claims, 2 Drawing Figures

PATENTED OCT 3 1972  3,695,132

APPARATUS FOR CUTTING SHEET MATERIAL

BACKGROUND OF THE INVENTION

The present invention relates to apparatus for cutting sheet material, and in particular to apparatus which completely severs and separates one portion of a sheet of material from the remainder of the sheet.

It is known to cut sheet material by feeding the sheet material between cutting blades and a reaction surface. The cutting blade can be mounted on a flat or a circular support member.

In order to facilitate the disengagement of the cutting blades after a cutting operation, it is known to provide on both parts of the latter compressible elements. The cut sheet then leaves the apparatus with its waste fixed to the flanks of the sheet either in an adhesive way and/or by fixing points, that is to say by non-cut parts.

In order to separate the waste from the flanks, various means are known including, severing by hand after cutting by means of a tool provided with prickers in relief having a shape approximately equal to the waste (or to the flank to be extracted) these prickers driving out the corresponding part, or in the orifices of a plate sustaining the elements of the other part, or in a flexible element. That means necessitates a separated tooling which is very expensive, and a very accurate positioning of prickers as well as of the sheets to be cut.

A similar system to that of above, consists of using a so-called barb cylinder, which also needs an accurate positioning of barbs and of the sheets.

Severing by vibration and/or brush is known, which is nevertheless not selective and the same energy is applied on the waste as on the flank. Unfortunately, the important necessary energy, in particular when the part to be eliminated has little surface in relation to the kept part, deteriorates the structure of certain products, such as, corrugated cardboard. Moreover the system is very costly.

AIM OF THE INVENTION

An object of the present invention is to overcome such drawbacks. In particular, an object of the present invention is the provision of an apparatus for cutting sheet material which is cheap to manufacture, easy to operate and which is capable of completely severing and separating a portion of a sheet from the remainder of the sheet.

According to the present invention, an apparatus for cutting sheet material, comprises a first member having a reaction surface for cooperating with a cutting blade carried by a second member, the first and second members being relatively movable so that when a sheet of material passes between them, the cutting blade can cooperate with the reaction surface to cut the sheet into first and second portions, means for maintaining the first portion to the apparatus after cutting, and means for repelling the second portion from the apparatus.

In a preferred embodiment, the first member is a cylindrical drum, the peripheral surface of the drum constituting the reaction surface, the second member being a substantially flat plate carrying a plurality of spaced cutting blades extending from a surface of the plate in a direction towards the reaction surface, the plate being reciprocable to and fro past the drum.

Preferably, the maintaining means is a suction head arranged level with the cutting blades and communicating with a source of vacuum by pipes passing from the suction head, through the plate to the source of vacuum.

Advantageously, the cutting blades have shanks which extend into the plate, said shanks having holes for the passage of said pipes therethrough.

The repelling means may include compressible and elastic elements attached to the plate, or pistons attached to the plate.

Preferably, means are provided for projecting a blast of fluid at one surface of the second portion, immediately after it has been repelled, to propel the second portion towards suction means.

DESCRIPTION OF THE DRAWINGS

An embodiment of the invention will now be described, by way of an example, reference being made to the Figures of the accompanying drawings in which.

DESCRIPTION OF A PREFERRED EMBODIMENT

Figure 1:
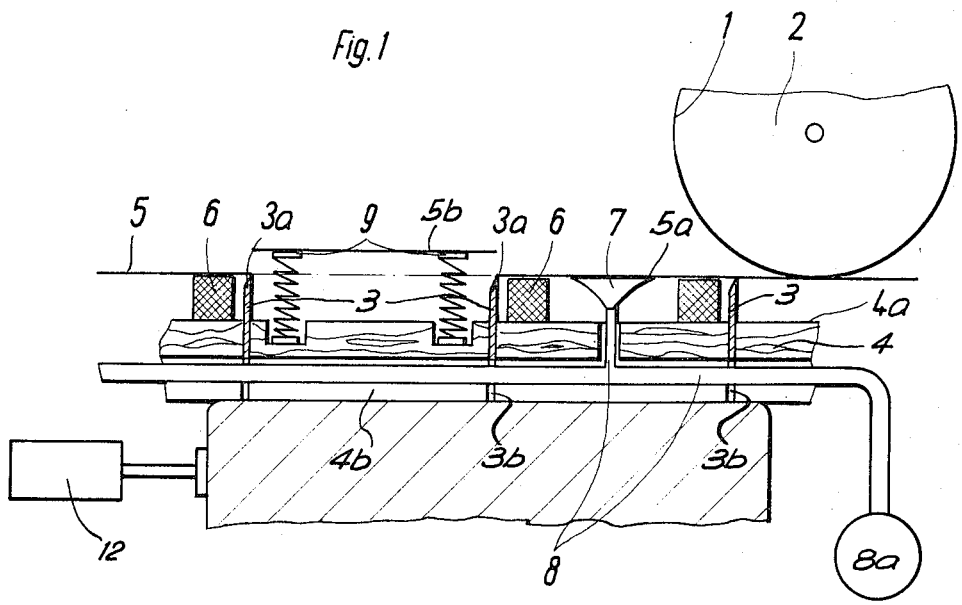
FIG. 1 is a schematic vertical cross-section of an apparatus according to the invention.

As shown in FIG. 1, an apparatus for cutting sheet material comprises a first member in the form of a drum 2 mounted on a horizontal axis and having a smooth peripheral reaction surface 1 and a second member 4 in the form of a horizontal plate delimited by an upper face 4a in relation to which vertical cutting blades 3 protrude. The blades 3 are spaced according to the size of the sheet which is to be cut.

A sheet 5 to be cut is placed flat on the upper cutting edges 3a of blades 3 and a horizontal displacement made, in order to cut, in relation to the drum 2 and the support 4, in such a way that the cutting edges 3a of blades 3 shall be pressed against the smooth surface 1 of the drum 2 driving in a sheet 5.

FIG. 1 shows the state of a sheet 5 after a cutting operation which takes place after translation of support 4 from the right to the left as indicated by the arrow, under the command of means such as piston and cylinder device 12.

As soon as the cutting blades 3 cease to be applied on the smooth surface 1 of drum 2, the sheet 5 to be cut is disengaged from the blades 3 by means of compressible and elastic stops 6 arranged between the blades 3 between the sheet 5 and the plate 4.

In order to ensure the severance between the part constituting the waste and the remainder of the sheet, one of the parts, for example the part 5a is maintained against the upper edges 3a of blades 3 by means of one or several suction valves 7 placed under each flank 5a and connected to pipes 8.

These pipes 8 are lodged in cavities 4b provided in plate 4, and are connected to a vacuum source 8a. The shanks of the blades 3 are formed with holes 3b to permit passage of the pipes 8 in order to avoid any deterioration of the pipes.

Each waste part 5b, cut from the sheet 5, is separated from each adjacent part 5a by ejection means 9 repelling upward each waste part 5b.

Figure 2:
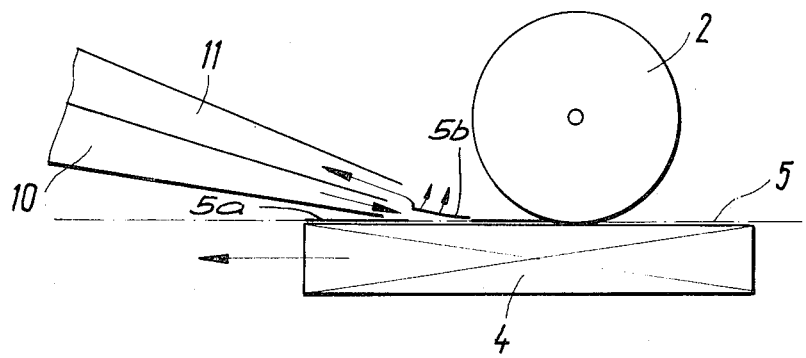
FIG. 2 is a partial, schematic side view of the apparatus of FIG. 1 provided with a device for the evacuation of waste.

As soon as the waste part 5b has been separated from the part 5a, it can be evacuated as shown in FIG. 2. For that purpose, a pipe 10 connected to a source of fluid under pressure, for example, compressed air, and laid in such a way as to project a flow of fluid under the waste 5b, in order to lift it a little and bring it in front of a suction pipe 11 connected to a vacuum source in which the waste part 5b is sucked to be transferred to any appropriate place.

Of course, according to a varied embodiment, the parts could be disengaged by the ejectors 9 while the waste 5b would be maintained on the blades 3 by suction valves 7.

In a preferred embodiment of the invention, the ejectors 9 are constituted by spring pistons which, when they are extended, protrude in relation to the upper edge 3a of blades 3 at a height at least equal to the thickness of the sheet 5 to be cut.

One of the parts, waste or flank, is maintained against blades 3 either by means of a vacuum under it or by a mechanical device such as a grip, or an elastic device exerting a pressure inferior to that of the ejectors and so on.

The ejectors 9 can be constituted by pistons or by hooks, that latter embodiment being interesting for apparatus with several drums whose movement is synchronized in relation to a forward movement of the tool for cutting.

In the cutting machine which has been described by way of example, the support 4 of cutting blades 3 is plane while the reaction surface 1 is that of a cylindrical drum 2. Nevertheless, the support 4 could be also constituted by a cylinder or a portion of cylinder, in the case of a rotating cutting, or even the drum 2 could be replaced by a smooth plate cooperating with a plan support 4, in the case of a flat cutting.

What is claimed is:

1. An apparatus for cutting sheet material, comprising a cylindrical drum the peripheral surface of which constitutes a reaction surface, a substantially flat plate carrying a plurality of spaced cutting blades extending from a surface of the plate in a direction towards the reaction surface of the drum, means for feeding sheet material between the plate and the drum, and means for reciprocating the plate to and fro past the drum so that the cutting blades cooperate with the reaction surface of said drum to cut the sheet material into first and second portions, means for retaining the first portion, after cutting, in the apparatus and means for repelling the second portion from the apparatus.

2. An apparatus according to claim 1, wherein the retaining means is a suction head arranged level with the cutting blades and communicating with a source of vacuum by pipes passing from the suction head, through the plate to the source of vacuum.

3. An apparatus according to claim 2, wherein the cutting blades have shanks which extend into the plate, said shanks having holes for the passage of said pipes therethrough.

4. An apparatus according to claim 1, wherein the repelling means include compressible and elastic elements attached to the plate.

5. An apparatus according to claim 1, wherein the repelling means are pistons attached to the plate.

6. An apparatus according to claim 1, wherein means are provided for projecting a blast of fluid at one surface of the second portion, immediately after it has been repelled, to propel the second portion towards suction means.

* * * * *